United States Patent [19]

Nemirovsky

[11] Patent Number: 4,881,727

[45] Date of Patent: Nov. 21, 1989

[54] CLAMPING MECHANISM

[75] Inventor: Robert Nemirovsky, 1117 Hyman Ave., Bay Shore, N.Y. 11706

[73] Assignees: Joseph Deutsch; Robert Nemirovsky, both of Bay Shore, N.Y.

[21] Appl. No.: 211,478

[22] Filed: Jun. 24, 1988

Related U.S. Application Data

[63] Continuation-in-part of Ser. No. 82,307, Aug. 6, 1987, Pat. No. 4,784,064.

[51] Int. Cl.⁴ .............................................. B23Q 3/02
[52] U.S. Cl. .................................................... 269/309
[58] Field of Search .................... 72/481; 83/698–700; 409/219, 220; 29/56.6; 269/20, 309–311, 58, 99–100, 78, 81–85, 47; 198/345; 104/75, 134, 135, 139

[56] References Cited

U.S. PATENT DOCUMENTS

| | | | |
|---|---|---|---|
| 1,393,083 | 10/1921 | Campbell | 269/99 |
| 3,865,360 | 2/1975 | Schweidler | 269/81 |
| 3,942,780 | 3/1976 | Clement | 269/310 |
| 4,500,079 | 2/1985 | Morghen | 269/309 |
| 4,534,546 | 8/1985 | Cattani | 269/58 |
| 4,611,484 | 9/1986 | Kissinger et al. | 269/309 |
| 4,738,439 | 4/1988 | Satake | 269/309 |

FOREIGN PATENT DOCUMENTS 804351  2/1981  U.S.S.R. ............................... 269/81

Primary Examiner—Robert C. Watson
Attorney, Agent, or Firm—Kane, Dalsimer, Sullivan, Kurucz, Levy, Eisele and Richard

[57] ABSTRACT

A clamping or locking mechanism for interlocking two members includes a shaft slidably disposed in corresponding openings of the members. The shaft has a curved surface and one of the members includes a channel traversal to the opening of this member. In the channel there is an actuating element having a curved surface matching the curved surface of the shaft. As the actuating means is urged toward or away from the shaft, the curved surfaces cooperate to force the shaft to move axially clamping the two members.

11 Claims, 1 Drawing Sheet

CLAMPING MECHANISM

RELATED APPLICATION: This is a continuation-in-part application to application Ser. No. 082,307, filed Aug. 6, 1987, entitled A DEVICE FOR POSITIONING AN OBJECT, now U.S. Pat. No. 4,784,064.

BACKGROUND OF THE INVENTION

1. Field of Invention

This invention pertains to a mechanism for locking several articles together to prevent relative movement therebetween, and more particularly, a mechanism which has a locked position in which the mechanism interlocks several articles, and an unlocked position in which the articles have some degree of freedom of movement.

2. Description of the Prior Art

A wide variety of clamping mechanisms have been used in the industry for many years. In automated machines with high volume production, it is important that the clamping mechanisms be reliable and durable to minimize the time required for repairs and maintenance of these machines. In particular, clamping mechanisms used in machining centers, optical experiments, laser manufacturing, and so on, require that each workpiece be held securely while an operation is performed on them, and furthermore, each workpiece must be held precisely at a preselected location. Most types of clamping mechanisms utilize screws, wedges or other similar devices which generate a clamping force between the members of the locking mechanism in a very inefficient manner. Furthermore during the application of a clamping force, deflection of the members due to undesirable bending loads imposed on the structural components of the locking mechanisms and due to the normal wear and tear degrade the performance and accuracy of the mechanisms.

These deficiencies are evident for example in U.S. Pat. No. 4,534,546 (which discloses wedge-type mechanism with two abutting chamfers) and U.S. Pat. No. 4,095,687 (which discloses a V-groove and a V-shaped head for abutting sloping surfaces). Other inventions (such as U.S. Pat. No. 4,201,284) try to eliminate inaccuracies in a clamping mechanism due to wear. However these mechanisms are complicated and expensive to manufacture.

OBJECTIVES AND SUMMARY OF THE INVENTION

In view of the abovementioned disadvantages of the prior art, it is an objective of the present invention to provide a locking mechanism which is reliable, yet inexpensive.

A further objective is to provide a locking mechanism which performs for long periods of time reliably, independently of normal wear and tear of its components.

A further objective is to provide a locking mechanism in which undesirable displacement due to bending moments within the mechanism is minimized.

Other objectives and advantages of the invention shall become apparent from the following description of the invention.

A clamping mechanism for interlocking a first and a second member constructed in accordance with this invention comprises a shaft slidably passing through two openings formed in said members. The shaft has a curved surface and one of the members has a channel means intersecting the coresponding opening. An actuating means is provided in the channel means which cooperates with said shaft to move said shaft axially in one direction for interlocking the members by the engagement of said shaft and a curved surface on said actuating means.

DETAILED DESCRIPTION OF THE INVENTION

One important advantage of the present invention is that its operation is completely independent of its orientation and therefore terms such as up, down, top, or bottom are used in conjunction with the drawings only to facilitate the description of the invention and are not to be interpreted as limitations on the scope of the invention.

Figure 1:
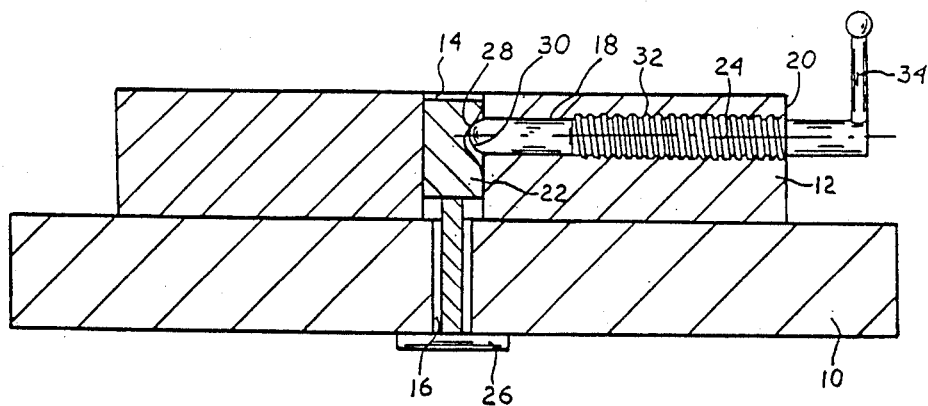
FIG. 1 shows a cross-sectional view of two members coupled by a clamping mechanism constructed in accordance with the invention.

Refering now to the Figures, FIG. 1 shows a locking mechanism constructed in accordance with the invention for locking two members together, such as members 10 and 12. Member 12 is provided with a hole 14, while member 10 is provided with a corresponding opening 16. The relative movement of members 10 and 12 is determined by the shape of opening 16. If opening 16 has a circular cross-section, then the members 10, 12 may rotate around an axis passing through hole 14 and opening 16. Alternatively, opening 16 may also extend longitudinally along member 10, in which member 12 can be rotated with respect to member 10 and translated along a path defined along opening 16.

Member 12 has a channel 18 extending from a sidewall 20 of member 12 to hole 14. The locking mechanism consists of two elements: a shaft 22 slidably disposed in hole 14 and opening 16, and an actuating element 24 disposed in channel 18 as shown. At one end, shaft 22 has an enlarged head 26 which is larger then opening 16. At a region adjacent to channel 18, shaft 22 is provided with a curved concave surface 28 formed on a sidewall of the shaft. Shaft 22 may have any desired cross-section, i.e. it may be round, square, rectangular, and so on. Surface 28 may be made in the shaft in any known manner.

Actuating element 24 extends through channel 18 and is terminated at one end facing hole 14 with a curved convex surface 30. Preferably the curvature of surface 30 is equal to the curvature of surface 28. At least a portion of channel 18 is threaded as at 32 and actuating element has matching threads engaging the threads of the channel 18. At the end of actuating element 24, extending past sidewall 20, there is provided a handle 34. Because of the engagement of the threads, rotating handle 34 in a first direction advances the actuating element 24 toward hole 14, while rotating the handle 34 in the opposite direction retrieves the actuating element 24.

The locking mechanism operates as follows. In the unlocked position, the actuating member may make contact with but does not apply any substantial force on the shaft 22, and therefore members 10 and 12 are free to move as described above. However, when handle 34 is moved to advance the actuating element 24, this movement in a direction perpendicular to the shaft axis generates an axial force directed upwardly on shaft 22 at the interface between the two curved surfaces 28 and 30. This force clamps the members 10 and 12 together thereby eliminating any movement therebetween. It was found that this clamping action can be accomplished very fast and in a smooth manner. For example, if surfaces 28 and 39 have a curvature of ⅛ of an inch, and the threaded portions of channel 18 and actuating member 24 have a pitch of 1/24 then the members 10 and 12 can be clamped by turning handle 34 by an arc of 20-25 degrees. When the actuating member 24 is retracted, the clamping force disappears and the members 10 and 12 are free to move again.

Figure 2:
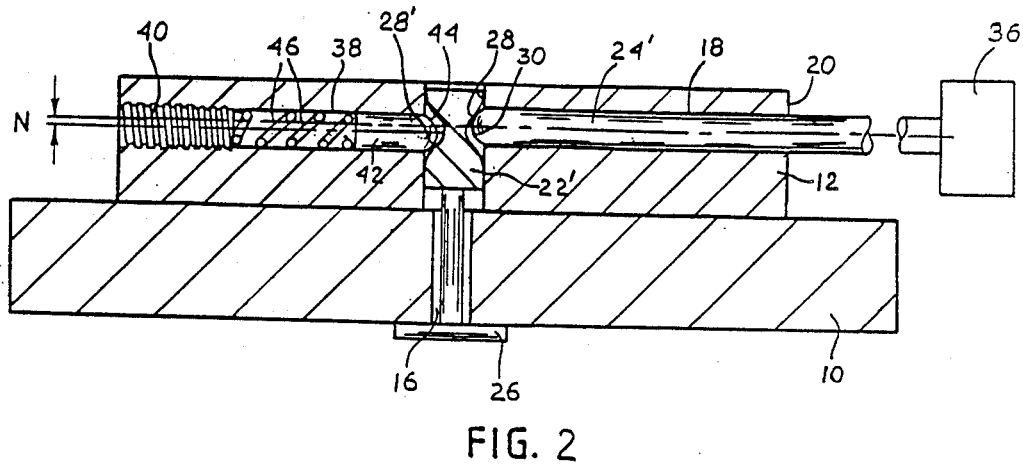
FIG. 2 shows a cross-sectional view similar to FIG. 1 with a first alternate embodiment of the invention.

A number of variations from the structure of FIG. 1 are shown in FIG. 2. In this figure, actuating member 24' is slidably disposed in channel 18 and is connected at its external end to a drive means 36. This drive means may be any well known means for reciprocating actuating member 24', such as a pneumatic means, hydraulic means, electric means, electromechanic means and so on. These drive means allow the locking mechanism of the invention to be incorporated into an automated and/or remote controlled operation.

A second variation shown in FIG. 2, which is completely independent of, and may be implemented with or without the first variation described above, comprises a returning means for returning the shaft 22' toward the unlocked position. As shown in FIG. 2, shaft 22' is provided with a second curved surface 28' opposite first surface curved 28 described previously. This second surface 28' may be made independently of surface 28. Alternatively, if shaft 22' is cylindrical, at least in the region adjacent to channel 18, then surfaces 28 and 28' can be formed simultaneously by cutting an annular groove in shaft 22', which groove extends circumferentially around the shaft. In addition, member 12 is provided with a second channel 38 which is plugged at one end by a threaded plug 40. Channel 38 is axially offset from channel 18 by a distance designated N in FIG. 2 and 3. Within channel 38 there is a slug 42 having at one end a curved surface 44 similar to curved surface 30 of actuating element 24'. Also in channel 38 there is a compression spring 46 which urges slug 42 toward shaft 22'.

The operation of the embodiment is similar to the embodiment of FIG. 1. The force generated by actuating element 24' toward shaft 22' is transformed into an axial upward force by surfaces 28 and 30, thereby clamping members 10 and 12. When the actuating element 24' is retracted, slug 42 forces the shaft downward thereby positively disengaging members 10 and 12. The returning axial force generated by slug 42 results in a smoother and more precise operation of the lock.

Figure 3:
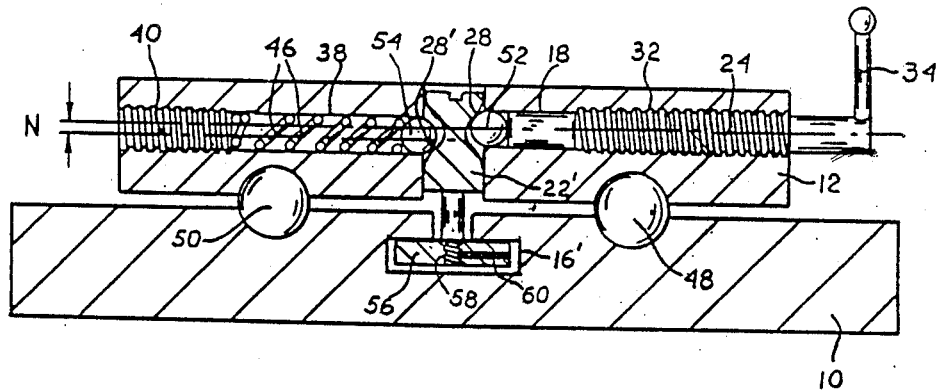
FIG. 3 shows a cross-sectional view similar to FIG. 1 with a second alternate embodiment of the invention.

FIG. 3 shows how a locking mechanism according to this invention is implemented in a specific device, namely a device for positioning an object described mroe fully in application Ser. No. 082,307, now U.S. Pat. No. 4,784,064 mentioned above. In this embodiment elements 10 and 12 are separated by rolling balls 48 and 50. When the mechanism is locked, the two members are clamped together. When the mechanism is unlocked, member 12 is free to rotate and translate with respect to member 10. The embodiment further illustrates two more variations for the invention. First, actuating member 24" does not contact shaft 22' directly. Instead, between the actuating member 24" and shaft 22' there is a ball 52. Similarly, slug 42 from FIG. 2 is replaced by a second ball 54. The advantage of this variation over the previous embodiments is that the curved surfaces which act as interfaces between the shaft 22', the actuating member and the returning means (if any) should be hardened to extend the useful life of the mechanism. This is relatively easily done in the present embodiment by using readily available hardened balls. Secondly, the balls may be slidably disposed in their holes and may rotate slightly as the shaft is raised and lowered thereby insuring a longer life.

In addition, instead of the head 26 of the shaft 22' adjustable bearing disk 56 rides in a T-shaped slot 16' instead of riding on an outer surface of member 10. Adjustable bearing disk 56 is in threaded engagement with shaft 22' as shown at 58 and is secured in a preselected position by two sets of screws 60, only one of which is shown in FIG. 3 for clarity.

It is clear from the above description, that the subject invention provides a simple, yet effective locking mechanism. The only wear and tears occurs at curved surfaces interfacing the various elements of the mechanism, and this wear is automatically compensated without affecting the performance of the mechanism. Finally all the forces generated during the clamping of the members are applied directly between the actuating member and the shaft and do not affect any of the surfaces of the members to be clamped. Finally, one skilled in the art will appreciate that all the elements of the mechanism may be conveniently housed in the members to be clamped and therefore require no additional space.

Obviously numerous modifications can be made to the invention without departing from its scope as defined in the appended claims.

I claim:

1. A clamping mechanism for clamping a first and a second member, said members having corresponding first and second openings, respectively, said second member having a longitudinal channel transversal to said first opening, comprising:
   a shaft disposed in said aligned openings, said shaft having engaging means for engaging said first member, and a shaft concave surface facing said longitudinal channel;
   actuating means reciprocatingly disposed in said longitudinal channel, said actuating member terminating in a convex surface facing said concave surface;
   said shaft and said actuating means cooperating to urge said shaft in a first direction to clamp said members when said actuating means is moved toward said shaft by engagement of said curved surfaces to generate an axial force on said shaft;
   said shaft and actuating means cooperating to release said members when said actuating means is moved away from said shaft; and
   returning means for urging said shaft in a second direction opposite said first direction.

2. The clamping mechanism of claim 1 further comprising drive means coupled to said actuating means for selectively reciprocating said actuating means.

3. The clamping mechanism of claim 2 wherein said drive actuating means and said second member are threadedly coupled, and wherein said actuating means comprises a handle for rotating said actuating means.

4. The clamping mechanism of claim 1 wherein said second member includes a second channel axialy displaced from said first longitudinal channel, and wherein said returning means is disposed in said second channel.

5. The clamping mechanism of claim 4 wherein said shaft has a first shaft concave surface opposite said actuating convex surface, and a second shaft concave surface facing said second channel.

6. The clamping mechanism of claim 5 wherein said returning means includes slug means having a slug convex surface facing said second shaft concave surface.

7. The clamping mechanism of claim 6 further comprising spring means disposed in said second channel for urging said slug means towards said shaft.

8. A clamping mechanism for clamping a first member to a second member, said members having first and second corresponding openings, said second member having first and second channels traversing a corresponding opening, comprising:
- a shaft slidably disposed in said openings and having an enlarged head for engaging said first member when said shaft is moved in a first axial direction, and first and second concave curved surfaces facing said first and second channels;
- a first ball disposed in said first channel for applying a first axial force on said shaft in response to a first force for moving said shaft in said first axial direction;
- a second ball disposed in said second channel for applying a second axial force on said shaft in response to a second force; and
- actuating means disposed in said first channel and returning means disposed in said second channel for applying said first and second forces;
- said shaft urging said first member against said second member in response to said first axial force, and releasing said first and second members in response to said second axial force.

9. The clamping mechanism of claim 8 wherein said returning means includes a compression spring disposed in said second channel for applying said second axial force on said shaft.

10. The clamping mechanism of claim 8 wherein said concave surfaces are formed by making an annular groove on the shaft.

11. The clamping mechanism of claim 8 wherein said first and second channels are offset axially by a preselected distance.

* * * * *